June 20, 1950 A. R. LOFSTRAND, JR 2,512,281
SPRAY GUN HANDLE
Filed July 11, 1946
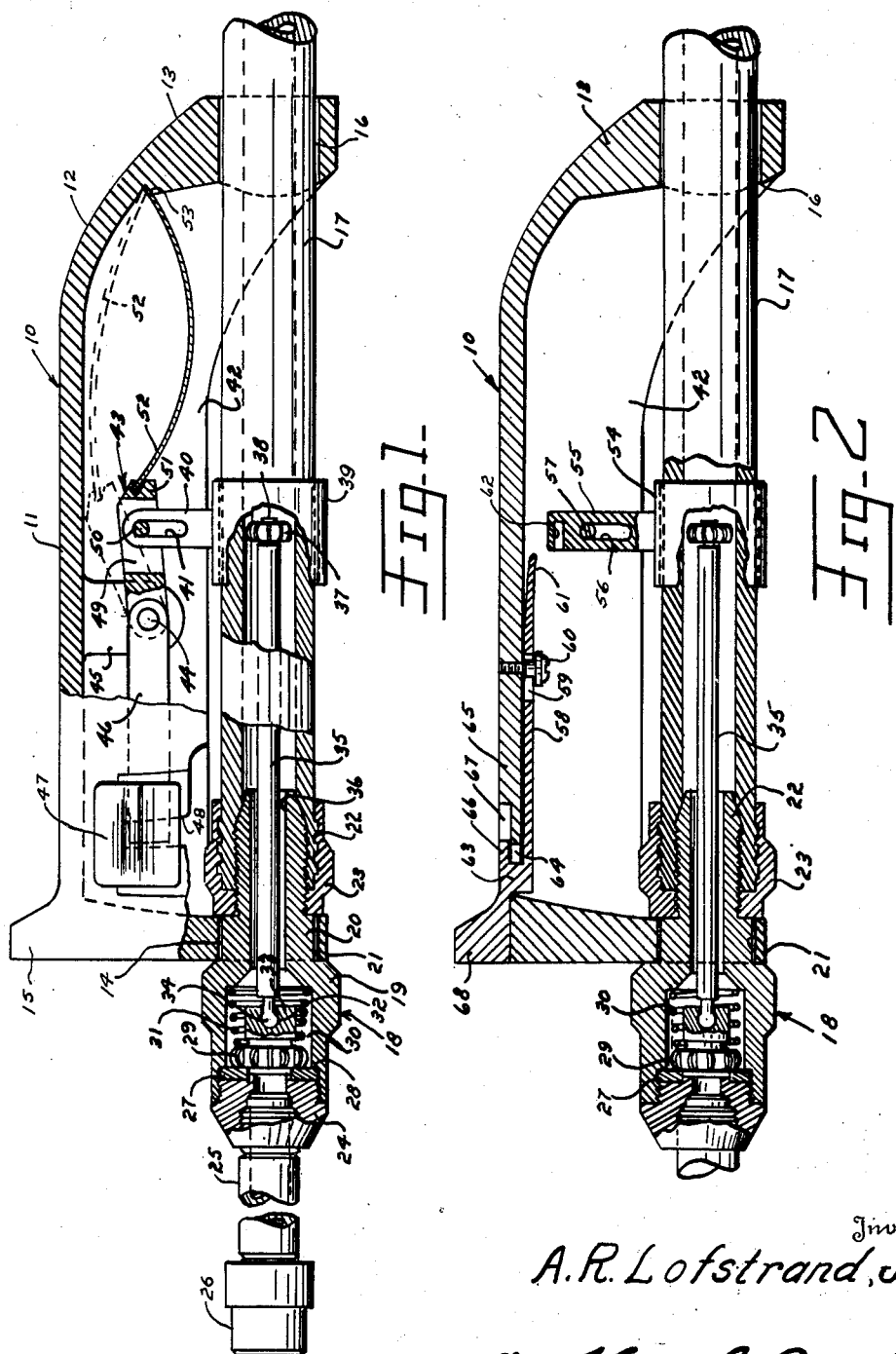
Inventor
A. R. Lofstrand, Jr.
By Kimmel & Crowell
Attorneys Patented June 20, 1950

2,512,281

UNITED STATES PATENT OFFICE 2,512,281

SPRAY GUN HANDLE

Anders Rudolf Lofstrand, Jr., Silver Spring, Md.

Application July 11, 1946, Serial No. 682,841

4 Claims. (Cl. 251—115)

This invention relates to sprays and more particularly to an improved valve and operator for a spray nozzle.

An object of this invention is to provide in a spray nozzle, a handle therefor and a valve operator associated with the handle so that the valve can be actuated to either opened or closed position by the same hand which supports the nozzle.

Another object of this invention is to provide a handle which is rotatably secured to the valve so that the hose and valve may rotate relative to the handle and thereby eliminate twisting of the hose.

A further object of this invention is to provide in combination with a valve, an elongated stem rockably secured to the valve plug and extending into the adjacent end of the rubber hose, the hose extending between two loose supports carried by a handle, so that the fingers grasping the handle may engage about the hose to effect bending of the latter and consequent rocking of the valve stem. Rocking of the valve stem inwardly of the handle will effect movement of the valve plug to open position. The handle also includes means whereby the hose may be locked in its bent position to thereby maintain the valve plug in open position.

A further object of this invention is to provide an improved valve structure for use with a sprayer handle.

With the above and other objects in view, my invention consists in the arrangement, combination and details of construction disclosed in the drawings and specification, and then more particularly pointed out in the appended claims.

In the drawings,

Wherein similar reference characters designate similar parts throughout the respective views, Figure 1 is a detail side elevation, partly broken away and in longitudinal section, of a sprayer handle and valve structure constructed according to an embodiment of this invention, Figure 2 is a longitudinal section, partly broken away and in elevation, of a modified form of this invention.

Referring to the drawings, the numeral 10 designates generally a handle which includes a substantially U-shaped body 11 formed at the rear end thereof with a downturned wall 12 terminating in a relatively thick or heavy rear end wall 13. The forward end of the body 11 has formed integral therewith a front wall 14 and a projection or lug 15 extends upwardly from the body 11. The rear wall 13 is formed with an opening 16 therethrough for loosely receiving a rubber hose 17.

The hose 17 is adapted to rotate within the hole 16 so that, as will be hereinafter described, the hose will not become twisted and will not be inwardly bent between the end walls 13, 14, under continual inward bending of the hose during the operation of the valve structure, which will be hereinafter described. The hose 17 is coupled to a valve structure generally designated as 18.

The valve structure 18 includes a housing 19 formed with a nipple 20 which is loosely mounted in an opening 21 formed in the forward wall 14. A threaded nipple 22 is extended rearwardly from the nipple 20 and a coupling member 23 is threaded onto the nipple 22 and binds the forward end of the hose 17 to the nipple 22. The housing 18 also includes a coupling plug 24 at its forward end which is threaded into the forward end of the housing 18 and which has a pipe 25 threaded thereinto.

The pipe 25 has mounted on the forward end thereof a spray nozzle 26 of conventional construction. A gasket 27 is interposed between the inner end of the plug 24 and a shoulder 28 formed in the housing 18. A ribbed valve plug 29 is adapted to normally engage against the gasket or seat 27, being constantly urged to closed position by means of a spring 30 disposed in the bore 31 of the housing 18. The valve plug 29 also includes a stem 32 which is formed with a ball socket 33 within which a ball 34 loosely engages.

An elongated valve stem 35 is fixed to the ball 34 and extends through the bore 36 of the nipple 22. The stem 35 has mounted on the rear end thereof a ribbed plate 37 which is mounted on a reduced stud or extension 38 formed at the rear end of the stem 35. A metal sleeve 39 is disposed loosely about the hose 17, being positioned at the terminal end of the stem 35 so that the ribbed plate 37 is disposed in substantially the transverse median of sleeve 39.

The sleeve 39 has extending therefrom, an arm 40 formed with an elongated slot 41. The arm 40 extends between the opposite legs 42 of the U-shaped member 11. In order to provide a means whereby, upon inward bending of the hose 17 between the sides 42 of the handle, the hose will be maintained in its inwardly bent position so as to thereby hold the valve plug 29 in open position, I have provided a rockable lever generally designated as 43. The lever 43 is rockably mounted on a pivot 44 carried by at least one ear 45 positioned within the handle 10. The lever 43 also includes a second lever 46, disposed on an obtuse angle to the lever 43 and extending forwardly from the pivot 44.

A finger or thumb engaging member 47 is fixed relative to the lever 46 and is disposed on the outer side of one of the sides 42 of the handle 10. The handle 10 is formed with an elongated slot 48 through which the lever 46 projects laterally in order that the operator 47 may be disposed on the outer side of the handle 10. The lever 43 is formed with an elongated slot 49 within which the arm 40 loosely engages, and a pin 50 extends through the slot 49 and loosely engages in the slot 41.

The forward end of the lever 43 is formed with a notch 51 within which the forward end of an elongated spring 52 is adapted to engage. The other or rear end of the spring 52 engages in a notch 53 which is formed in the inner side of the rear wall 13. When the lever 43 is in released position, spring 52 will be downwardly or outwardly bowed, as shown in full line in Figure 1, whereas when the hose 17 is flexed inwardly, and lever 43 is rocked inwardly to the dotted line position, spring 52 will be bowed in the opposite direction, as shown in dotted lines and will thus yieldingly hold the hose in inwardly flexed position, in which position the valve plug 29 will be moved to open position.

Referring now to Figure 2, there is disclosed a modified form of this invention. In this form there is disclosed a handle 10a which is substantially similar to the handle 10. A hose 17 is loosely mounted through the opening 16 formed in the rear end wall 13 of the handle, and the forward end of the hose 17 has mounted thereon a valve housing 18 which is identical with the housing shown in Figure 1.

The housing 18 has mounted thereon a valve plug 29 which is normally urged to valve closing position against the valve seat or gasket 27 by means of a spring 30. The valve plug 29 is adapted to be moved to open position by tilting of the valve stem 35, the latter having a ribbed plate 37 on the rear end thereof. The housing 18 is loosely mounted in the opening 21 formed in the forward wall 14 of the handle 10 and the hose 17 is coupled to the nipple 22 of the valve housing by a coupling sleeve 23.

A sleeve 54 is loosely mounted on the hose 17 in a position to telescope over the ribbed plate 37 outside of the hose, and the sleeve 54 has fixed thereto an inwardly extending arm 55 which is formed with an elongated slot 56. A stop pin 57 is extended across the parallel sides 42 of the handle 10 and limits the outward movement of the arm 55 and the sleeve 54.

In order to provide a means whereby the hose 17 will be locked in its inwardly bent or bowed position, I have provided an elongated locking bar 58. The bar 58 is disposed on the inner side of the handle 10 and is formed with an elongated slot 59 through which a headed bolt 60 loosely engages. The inner or rear end of the locking bar 58 is outwardly bent as indicated at 61 and is adapted to engage in a slot or keeper 62 which is formed in the arm 55. The forward end of the bar 58 is enlarged as indicated at 63 and extends laterally or outwardly through the opening 64 which is formed in the bight 65 of the handle 10.

A rearwardly projecting lug 66 is formed integral with the extension 63 and loosely engages in a recess 67 formed in the outer side of the bight 65. An operating lug or button 68 extends forwardly and outwardly from the extension 63 and is adapted when the locking bar 58 is in released position to be disposed with the forward end thereof flush with the forward side of the wall 14.

In the use and operation of this combined handle and valve structure, when the handle 10 and the hose 17 are in the positions shown in full lines in Figure 1, spring 30 will hold the valve plug 29 in closed position against the gasket 27. When it is desired to move the valve plug 29 to an open position, the hose 17 is flexed inwardly between the parallel sides 42 of the handle 10 thereby rocking the stem 35 and causing rearward pull on the plug 29.

The hose 17 may be retained in its inwardly flexed position for holding the valve open by moving the button 47 downwardly so as to reverse the bow of spring 52 to the dotted line position shown in Figure 1. The hose 17 is not only loosely mounted in the handle 10 but is also loosely mounted in the sleeve 39 so that the hose or the handle may be rotated, one relative to the other. In this manner the hose 17 will be held against the formation of an inwardly bowed position between the end walls 13, 14 due to the opening and closing of the valve.

In the event the hose 17 should become slightly bowed in an outward direction sufficient to hold the valve plug 29 open, the handle or the hose may be rotated sufficiently to overcome this bowing of the hose and thereby permit longer life to the hose and valve structure than would be the case where the handle 10 was firmly mounted on both the valve housing and the hose. Furthermore, with a construction as hereinbefore described, the hose will not become twisted by any turning of the handle.

The construction shown in Figure 2 operates in the same manner as the construction in Figure 1, with the exception of the locking means for locking the hose in its inwardly bent and valve opening position.

I do not mean to confine myself to the exact details of construction herein disclosed but claim all variations falling within the purview of the appended claims.

Having thus described my invention, what I desire to claim is:

1. A combined valve and handle comprising a handle member U-shaped in cross section, end members carried by said handle member formed with aligned holes, a flexible hose loosely extending through one of said holes, a valve loosely engaging through the other of said holes, means coupling said valve to said hose, said valve including a valve plug operating stem extending into said hose whereby bending of said hose between said end members will effect opening of said valve, a keeper carried by said hose and projecting into said handle, and a locking member slidably carried by said handle for locking said keeper in valve opening position.

2. In combination a valve structure, a hose connected to said structure, a valve operator extending lengthwise of said hose, a handle loosely engaging said hose and said structure and including means whereby a portion of said hose may be bent inwardly of said handle and said valve operator adjusted to valve opening position, a sleeve loose about said hose, an arm fixed to said sleeve and extending inwardly of said handle, and locking means carried by said handle engageable with said arm for locking said arm in innermost valve opening position.

3. In combination a valve structure, a hose connected to said structure, a valve operator extending lengthwise of said hose, a handle loosely engaging said hose and said structure and including means whereby a portion of said hose may be bent inwardly of said handle and said valve operator adjusted to valve opening position, a sleeve loose about said hose, an arm fixed to said sleeve and extending inwardly of said handle, a keeper carried by said arm, and a locking bar slidably carried by said handle engageable with said keeper for holding the latter in valve opening position.

4. A combined valve and handle comprising a handle member U-shaped in cross section, end members carried by said handle member formed with aligned holes, a flexible hose loosely extending through one of said holes, a valve loosely engaging through the other of said holes, means coupling said valve to said hose, said valve including a valve plug operating stem extending into said hose whereby bending of said hose between said end members will effect opening of said valve, a sleeve loose on said hose, an arm carried by said sleeve extending inwardly of said handle, a locking lever pivotally carried by said handle, a loose coupling between said lever and said arm, spring means for holding said lever in adjusted position, and an operating lever fixed to said locking lever.

ANDERS RUDOLF LOFSTRAND, JR.

REFERENCES CITED

The following references are of record in the file of this patent:

UNITED STATES PATENTS

| Number | Name | Date |
|---|---|---|
| 218,135 | Rich | Aug. 5, 1879 |
| 1,864,978 | Cottrell | June 28, 1932 |
| 1,994,098 | Fulton | Mar. 12, 1935 |
| 2,015,923 | Davis | Oct. 1, 1935 |
| 2,157,881 | Andreasen | May 9, 1939 |
| 2,366,424 | Perry | Jan. 2, 1945 |
| 2,419,720 | Knight | Apr. 29, 1947 |

FOREIGN PATENTS

| Number | Country | Date |
|---|---|---|
| 526,505 | Germany | of 1931 |